Dec. 9, 1952 V. D. LANDON 2,621,244
COLOR TELEVISION REGISTRATION SYSTEM
Filed Nov. 29, 1950
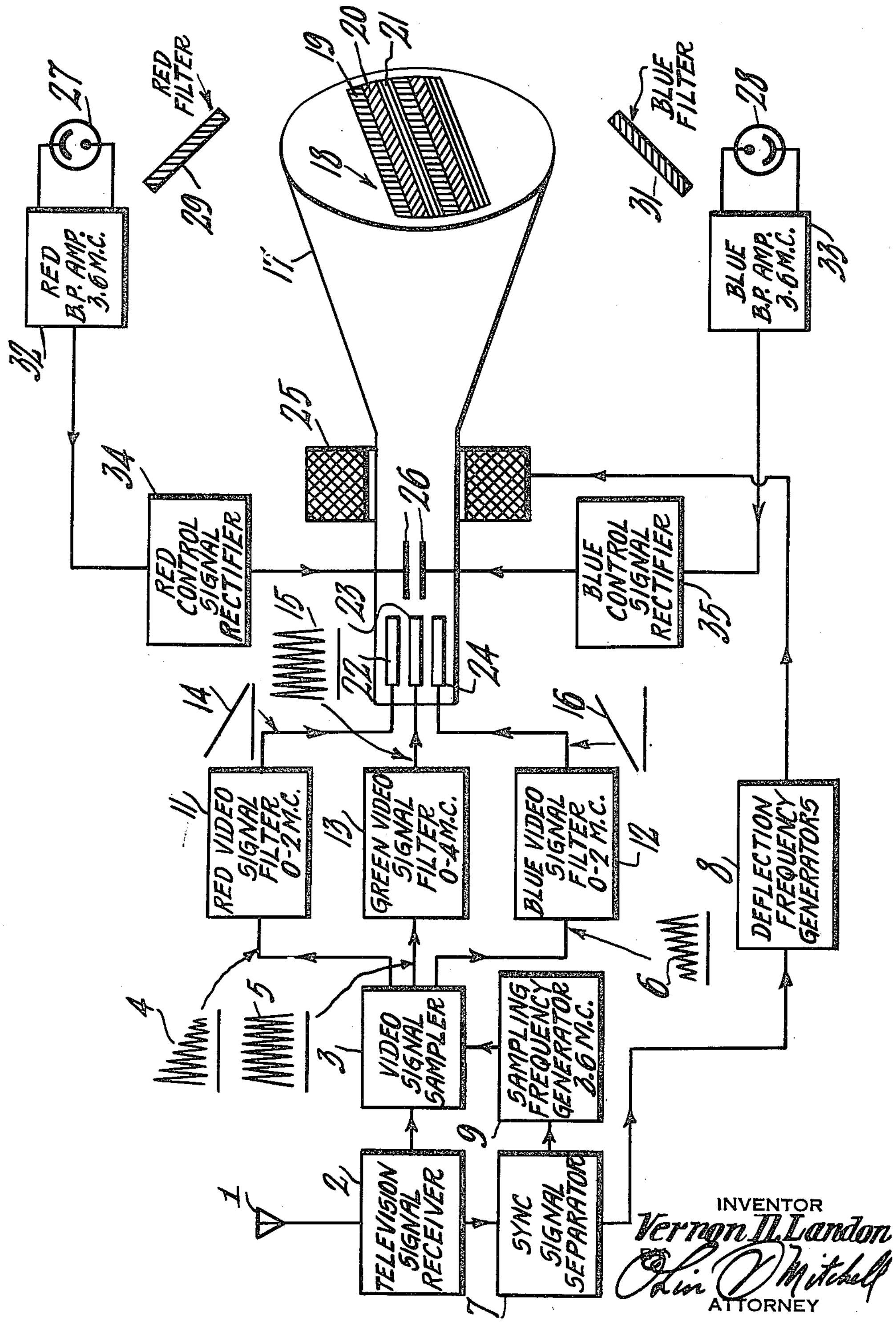
INVENTOR
Vernon D. Landon
BY Olin V. Mitchell
ATTORNEY Patented Dec. 9, 1952

2,621,244

UNITED STATES PATENT OFFICE 2,621,244

COLOR TELEVISION REGISTRATION SYSTEM

Vernon D. Landon, Princeton, N. J., assignor to Radio Corporation of America, a corporation of Delaware Application November 29, 1950, Serial No. 198,213

7 Claims. (Cl. 178—5.4)

This invention relates to color television systems and particularly to those systems which employ a single color kinescope for producing all of the component image colors.

Some color television systems employ kinescopes of the type in which the luminescent screens consist of different phosphors which are excited by electron beam energy to produce the component image colors. The successful use of such kinescopes requires a system for exciting the proper phosphors to correspond with the video signals which modulate the electron beam energy. The present invention is related principally to color television systems in which the color kinescope has a luminescent screen consisting of discrete phosphor strips which are capable respectively of emitting differently colored light when excited by electron beam energy. A representative tube of this type is disclosed in U. S. Patent 2,310,863, granted February 2, 1943 to H. W. Leverenz and titled "Luminescent Screen." In such a tube, each of the phosphor strips has a sub-elemental width such that a group of strips has a combined width which is no greater than one of the dimensions of an elemental image area. Each group of phosphor strips includes at least one of each of a plurality of component colors of the image to be reproduced.

Such a kinescope usually is employed with the phosphor strips extending horizontally. It then is necessary that the vertical deflection of the electron beam energy be controlled with a high degree of accuracy. With each horizontal sweep of the beam across the kinescope screen, the phosphor strip which is impinged by the beam energy must be capable of producing light of the color represented by the video signal with which the beam energy is modulated.

Accordingly, it is an object of the present invention to provide an improved electron beam registration system by which electron beam energy may be maintained in registration with a line phosphor screen of a multi-color kinescope.

Another object of the invention is to provide an improved electron beam registration system for maintaining electron beam energy in substantially exact registration with a line phosphor screen of a multi-color kinescope with a minimum of additional kinescope structure and with a relatively simple feed back circuit for beam-controlling energy.

Still another object of the invention is to provide an improved electron beam control system in which light from a line phosphor screen of a multi-color kinescope is modulated in a manner indicative of one of the component image colors.

In accordance with the invention, that portion of the electron beam energy which is representative of one of the image colors, is modulated with a component having a predetermined high frequency. Photo-electric devices are employed to receive light of the other two component colors and, so long as this received light does not contain the predetermined high frequency modulation component, the circuits controlled by the photoelectric devices are unresponsive. This is a normal condition which exists when the electron beam energy is in exact registration with the phosphor of the kinescope. Any deviation from this position causes that portion of the beam energy which is modulated with the high frequency component, to excite one of the phosphors by which light is produced for response by the photo-electric devices. Frequency-sensitive circuits associated with these devices detect the high frequency modulation of this light to produce beam-controlling signals. These signals are employed to alter the vertical position of the electron beam energy sufficiently to re-establish the proper registration with the line phosphor screen of the kinescope.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

The single figure of the drawing is a block diagram of a television signal-receiving and image-reproducing system embodying an illustrative form of the invention.

The present invention is in the nature of an improvement on the subject matter of a copending U. S. application of George C. Sziklai, Serial No. 51,766, filed September 29, 1949, now Patent No. 2,587,074 granted February 26, 1952 and titled "Color Television Image Reproducing System." In the Sziklai case it is proposed to incorporate a relatively high frequency component with each of the video signals representing the component image colors. The frequencies at which the video signals are modulated are different for each of the colors. Light corresponding to any particular one of the colors should have a predetermined frequency modulation when the electron beam energy is properly registered with the linear luminescent elements. Either one of the other frequencies with which the light may be modulated represents a mis-registration and is employed to develop a correcting signal. It is to be noted that, in the Sziklai case, the electron beam energy representative of each of the image colors is modulated at a relatively high frequency.

The present system is somewhat simpler in this respect in that only one of the component image colors is modulated at the relatively high frequency.

Having reference now to the drawing, the system embodying the invention includes an antenna 1 which is coupled to a television signal receiver 2. It will be understood that the receiver may be entirely conventional. For example, it may consist of one or more carrier wave amplifiers, a frequency converter and a demodulator or signal detector. In any case, there may be derived from the receiver 2 a video signal wave representing the component colors of the image and also synchronizing signals by which to control the deflection of the electron beam energy.

It is assumed for the purpose of this disclosure that the embodiment of the present invention is included in a color television system operating in accordance with the dot or elemental multiplex system. Such a system forms the subject matter of a copending U. S. application of John Evans, Serial No. 111,384, filed August 20, 1949 and titled "Color Television." In such a system, the color content of each elemental area of the image is transmitted and reproduced in a dot or elemental area sequence. One way of generating such a combination color video signal is to sample, at a relatively high frequency, each of the three video signals derived from different color cameras. The samples of each color are taken at intervals recurring at the dot repetition rate. The samples of the different colors are taken at different times during each of the recurring intervals. The combination video signal wave produced by such a process, therefore, has different instantaneous amplitudes representative, respectively, of the different color contents of the image.

In order to utilize such a system at the image reproducing point, it is necessary to extract the samples of video signals from the combination wave. In order to accomplish this result, the color video signal wave derived from the receiver 2 is impressed upon a video signal sampler 3. This device may have any one of several forms. For example, as shown in the copending Evans application referred to, the video signal sampler may consist of three gating devices. The gating devices are normally biased to inoperative states. The combination video signal wave is impressed continuously upon all of the gating devices. They are rendered operative for short periods of time in succession under the control of sampling frequency waves. This frequency, of course, is the same as that at which the original samples are taken at the transmitter to form the combination video signal wave.

As a result of the operation of the video signal sampler 3, there are derived from the output circuits thereof, three trains of video signals, one representative of each of the component image colors. The video signal trains derived from the sampler are in the form of pulses occurring at the sampling frequency. For example, the red, green and blue video signals are represented, respectively, by the waves 4, 5 and 6. It is assumed, merely for the purpose of the present disclosure, that, at the moment represented, the red video signals have a decreasing amplitude, the green video signals have a constant amplitude and the blue video signals have an increasing amplitude. It will be understood that the relative amplitudes of the video signals are dependent upon the light intensities of the image in the different component colors.

The synchronizing signal channel of the image-reproducing apparatus includes the usual synchronizing signal separator 7 coupled to the receiver 2. The horizontal and vertical synchronizing signals are separated from the video signals and from one another in the usual way. The synchronizing signals are impressed upon the deflection frequency generating apparatus 8 for the control thereof in a conventional manner. The output of the frequency deflection generators 8 is used to energize the deflection system of the kinescope.

The horizontal synchronizing signals derived from the synchronizing signal separator 7 also are impressed for control purposes upon a sampling frequency generator 9. This apparatus functions at a relatively high frequency which, in the present instance, is assumed to be approximately 3.6 megacycles to produce a control wave or waves by which to control the video signal sampler 3. In view of the foregoing description of the character of the video signal wave and the manner in which it is to be sampled, it is seen that the energy derived from the output of the sampling frequency generator is essentially three phase in character. The waves of the three phases are used to control the respective gating device of the video signal sampler. Essentially, the sampling frequency generator 9 may be a sine wave oscillator which is capable of stable operation at high frequencies and which is susceptible of synchronous control by pulses such as the horizontal synchronizing signals. One such device is shown in the book entitled "Wave Forms" published by McGraw-Hill Book Company, Inc. and appearing in Figure 4-45 at page 143.

Reverting now to a further consideration of the component image color-representative video signals represented by the waves 4, 5 and 6, they are impressed upon respective frequency selective circuits. The red and blue video signals, such as represented by the waves 4 and 6, are impressed respectively upon red and blue video signal filters 11 and 12. These filters may be substantially identical and are capable of transmitting signals having frequencies in the range of 0–2 megacycles. The green video signals represented by the wave 5 are impressed upon a green video signal filter 13. This device is capable of transmitting signals having frequencies in the range of 0–4 megacycles.

Accordingly, the pulse type red and blue video signals 4 and 6, having a repetition frequency of approximately 3.6 megacycles, are not reproduced as pulses in the output circuits of the red and blue filters 11 and 12 respectively. Instead, by reason of the relatively low frequency cutoff characteristic of these filters, only the envelopes 14 and 16 of the waves 4 and 6 are reproduced. By reason of the relatively broad pass band of frequencies capable of being transmitted by the green filter 13, the pulse type green signals 5 are reproduced in the output circuit without substantial modification as the pulse type signals 15.

The component color-representative video signals, such as indicated by the waves 14, 15 and 16, are employed to modulate electron beam energy by which to excite a line phosphor screen of a tri-color kinescope 17. This kinescope is provided with a luminescent screen 18 of the general character as that shown in the Leverenz patent previously referred to. The screen 18 consists of a multiplicity of groups of horizontal phosphor strips capable, respectively, of emitting light of the different component image colors when excited by electron beam energy. For example, one such group of phosphor strips includes red, green and blue light-producing strips 19, 20 and 21 respectively.

The electron beam energy, for exciting the screen 18 of the color kinescope 17, is assumed to be developed by three electron guns indicated at 22, 23 and 24. It may be considered that the guns 22, 23 and 24 produce electron beams by which to excite the red, green and blue phosphor strips. It will be understood that the arrangement of the electron guns relative to one another may be according to any desired pattern. For example, they may be arranged symmetrically around the longitudinal axis of the kinescope in a manner such as shown in U. S. Patent 2,481,839, granted to Alfred N. Goldsmith on September 13, 1949 and titled "Color Television." In the case of the Goldsmith tube, the guns are located substantially at 120 degree angles about the tube axis.

However, it will be understood that the arrangement of the electron guns is not important so long as they direct the electron beam energy toward the proper one of the phosphor strips to produce light of the color represented by the video signals by which the beams are modulated. In the present case, it is seen that the red, green and blue video signals represented at 14, 15 and 16, respectively, are impressed upon the electron guns 22, 23 and 24. Accordingly, it will be understood that electron beam energy from the gun 22, when properly directed, excites the red phosphor strips such as 19. Similarly, the electron beam energy from the guns 23 and 24 excites the green and blue phosphor strips such as 20 and 21.

The kinescope 17 also is provided with a deflection yoke 25. For the purpose of the present disclosure, it may be considered that this yoke is entirely conventional. It serves to produce an electromagnetic field varying suitably in intensity at the horizontal and vertical scanning rates to cause the electron beam energy from the guns 22, 23 and 24 to scan a conventional television raster at the luminescent screen 18. The yoke 25 is energized by saw-tooth waves at the horizontal and vertical scanning frequencies derived from the deflection frequency generators 8.

It will be understood that the kinescope 17 also is provided with the necessary apparatus (not shown) for accelerating and focusing the electron beam energy. In addition, for the purposes of this disclosure of the present invention, the kinescope 17 also is provided with a pair of vertical deflecting plates 26. The purpose of these plates is to supplement the vertical deflection field produced by the yoke 25 in a manner to effect exact registration by the electron beam energy and the different color-producing phosphor strips of the screen 18. The auxiliary deflecting system including the plates 26 is energized under the control of light produced by the screen 18.

The light, which is used for control of the auxiliary vertical deflection system, is the red and blue component image colors. For this purpose, there are provided red and blue-sensitive phototubes 27 and 28. These tubes may be provided with cathodes capable of response only to red and blue light, respectively. Alternatively, the phototubes 27 and 28 may be sensitive to light of any color. In this case, there is interposed between the screen 18 and the phototubes 27 and 28, respectively, red and blue light-passing filters 29 and 31. In any case, the arrangement is such that the phototube 27 is effective to develop a voltage representative of the red light derived from the kinescope screen 18. Similarly, the phototube 28 develops a voltage which is representative of the blue light produced by the kinescope screen.

The phototubes 27 and 28 are coupled, respectively, to red and blue band pass amplifiers 32 and 33. These amplifiers are frequency-selective over a band of frequencies centered substantially at 3.6 megacycles. The outputs of the amplifiers 32 and 33 are coupled, respectively, to red and blue control signal rectifiers 34 and 35. The rectifiers, in turn, are coupled to the auxiliary vertical deflecting plates 26 in phase opposition.

In operation, it is seen that only the light which is produced under the control of the green video signals 15 includes a component having a relatively high characteristic frequency. So long as the electron beam energy control system of the kinescope 17 is functioning to cause the impingement of the electron beam from the gun 23 upon the green light-producing phosphor strips such as 20, only the green light produced by the screen 18 has this distinctive high frequency modulation. The red and blue light produced under the control of signals, such as represented at 14 and 16, by the impingement of the electron beams from the guns 22 and 24 upon the blue and green phosphor strips, such as 19 and 21, does not contain this distinctive high frequency component. Accordingly, the red and blue light, which is impressed upon the phototubes 27 and 28 causes the production of voltages by these tubes which do not contain the high frequency modulation component. These voltages are not passed by the amplifiers 32 and 33 because of the frequency discriminating character of these devices. Accordingly, there are no control voltages impressed upon the auxiliary vertical deflecting plates 26.

However, should the electron beam energy from the guns 22, 23 and 24 be improperly registered with the phosphor strips of the screen 18, the electron beam from the gun 23 will excite either the red or the blue strips, such as 19 and 21. Accordingly, either the red or the blue control signal channel will be rendered operative to produce a voltage for impression upon the deflecting plates 26 in a sense and magnitude to modify the direction of the electron beam energy suitably to effect exact registration with the phosphor strips of the screen 18.

It is seen that the system embodying the present invention provides a relatively simple system of detecting mis-registration between the electron beam energy and the different phosphor light-producing areas of a multi-color kinescope screen. Not only is the mis-registration detection system simplified, but also the control system by which correct registration is effected is somewhat more straightforward than heretofore employed.

It will be understood that the invention may be used in other modifications, many of which will occur to those skilled in the art. For example, the high frequency component with which one of the electron beams is modulated may be derived in ways other than that disclosed herein for illustrative purposes. For example, a locally generated carrier wave may be modulated by one of the video signals as in the copending Sziklai application referred to.

Also, it is contemplated that the modulation of the intensity of an electron beam in accordance with this high frequency component may be done in ways other than by modulating the video signal at such a frequency. For example, a video signal without high frequency components may be impressed upon the control grid and the high frequency modulation upon the cathode of an electron gun.

Furthermore, it will be understood that the invention is not limited to an electrostatic type of auxiliary deflection system for effecting registration of the electron beam energy with the phosphor strips of a luminescent screen. An electromagnetic system may be employed with substantially equal facility. Moreover, it is contemplated that it will not be necessary, in all cases, to provide a separate auxiliary vertical deflection system for beam registration control. Those skilled in the art will understand that, alternatively, the control signals developed in response to mis-registration of the electron beam energy may be injected into the deflection yoke 25 in combination with the vertical saw-tooth deflection energy.

The nature of the invention may be ascertained from the foregoing description of an illustrative embodiment thereof. The scope of the invention is set forth in the appended claims.

What is claimed is:

1. In a color television system embodying a color kinescope having a line phosphor screen consisting of elements respectively capable of producing light of a plurality of component image colors when excited by electron beam energy deflected in a manner to scan a raster at said screen, a system for maintaining a predetermined registration of said beam energy with said screen comprising, a source of a plurality of video signals representative respectively of the component colors of an image, one of said video signals having a component rendering it distinct from all other video signals, means for modulating said electron beam energy by said video signals in such a manner that, normally, the screen-produced light of a predetermined image color has a component corresponding to said distinctive video signal component, and means responsive to light of a plurality of said component image colors other than that normally having said distinctive component and also sensitive to said distinctive component for controlling the deflection of said electron beam energy suitably to maintain proper registration thereof with said luminescent screen.

2. In a color television system embodying a color kinescope having a line phosphor screen of which the elements are capable respectively of producing light of a plurality of component image colors when excited by electron beam energy, a system for maintaining suitable registration of said beam energy with said screen to produce an image in its true component colors comprising, a source of video signals representative of the component colors of an image, means for segregating the video signals representative of the individual image colors, means for modifying at least one of said color-representative video signals with a component to render them distinct from all other video signals, means for modulating said electron beam energy under the control of all of said video signals, means for deflecting said modulated electron beam energy to scan a predetermined pattern at said luminescent screen so that, normally, only the screen-produced light representing the image color corresponding to the modified video signals has a distinctive component, and means responsive to light of the component image colors represented by the unmodified video signals and also sensitive to said distinctive component for controlling the deflection of said electron beam energy suitably to maintain proper registration thereof with said luminescent screen.

3. In a color television system embodying a multi-color kinescope having a line phosphor screen capable of producing light of a plurality of component image colors in different elemental sections of said screen when excited by electron beam energy, a system for maintaining said electron beam energy in proper registration with the elements of said screen to reproduce an image substantially in its natural colors comprising, a source of a plurality of trains of video signal pulses representing respectively said component image colors, said video signal trains having relatively high frequency pulse repetition rates, means for modifying said video signal trains by removing the relatively high frequency components from all but one of said trains, means for modulating said electron beam energy in accordance with said modified video signal trains, means for deflecting said modulated electron beam energy to scan said luminescent screen in such a manner that, normally, light of only a particular one of said component colors is modulated in accordance with said high frequency component, and means responsive to light of said normally unmodulated component image colors and sensitive only to said relatively high frequency component for modifying the deflection of said electron beam energy suitably to effect proper registration thereof with said line phosphor screen.

4. In a color television system embodying a color kinescope having a line phosphor screen of which the elements are capable respectively of producing light of a plurality of component image colors when excited by electron beam energy deflected in accordance with a predetermined pattern over said screen, a system for maintaining suitable registration of said beam energy with said screen to produce an image in its true component colors comprising, an individual source of an electron beam for each of said component image colors, means for deflecting said electron beams in such a manner that, normally, the beams respectively excite phosphor strips capable of producing different ones of said image colors, a source of video signals for each of said component image colors, means coupling said signal sources to said electron beam sources for modulating the intensities of said beams in accordance with the component image colors, means for energizing one of said electron beam sources to impart a distinctive modulation of one of said beams, whereby a particular one of said image colors has said distinctive component, and means sensitive to said distinctive component and responsive to screen-produced light of at least one of said component image colors not normally having said distinctive component for controlling the deflection of said beams suitably to effect proper registration thereof with said luminescent screen.

5. In a color television system embodying a multi-color kinescope having a luminescent screen formed of a multiplicity of groups of parallel strips of phosphors capable respectively of producing light of a plurality of component image colors when excited by electron beam energy, a system for maintaining said electron beam energy directed toward proper ones of said phosphor strips comprising, means for deflecting said beam energy to scan a raster at said luminescent screen, a source of a plurality of trains of video signals representing respectively said component image colors, each of said video signal trains having a relatively high frequency component, frequency selective means for modifying said video signal trains by removing said high frequency component from all but one of said trains, means for modulating said electron beam energy with said modified video signal trains so that, normally, only that screen-produced light of a particular image color has a distinctive component produced by said high frequency video signal component, means responsive to screen-produced light of any of said component image colors except said particular color and also responsive to said high frequency component to develop signal effects indicative of any mis-direction of said electron beam energy, and means for control by said signal effects to correct the direction of said electron beam energy relative to said phosphor strips.

6. In a color television system embodying a multi-color kinescope having a luminescent screen formed of a multiplicity of groups of horizontal strips of phosphors capable respectively of producing light of a plurality of component image colors when excited by electron beam energy, a system for maintaining said electron beam energy directed toward proper ones of said phosphor strips comprising, a source of a plurality of trains of video signals representing respectively said component image colors, means for deflecting said beam energy to scan a raster at said luminescent screen, means for modulating said electron beam energy in accordance with said video signal trains and also with a distinctive high frequency component in a manner that, normally, screen-produced light of a particular image color has said distinctive component, a plurality of control signal-generating means equal in number to one less than said plurality of component image colors and responsive respectively to screen-produced light of all except said particular colors, means coupled to said signal-generating means and responsive only to signals of said distinctive frequency to produce energy representative of any mis-direction of said electron beam energy relative to said phosphor strips, and means coupled to said frequency responsive energy-producing means for deflecting said beam energy vertically to correct its direction relative to said phosphor strips.

7. In a color television system embodying a tri-color kinescope having a luminescent screen formed of a multiplicity of groups of three horizontal strips of phosphors capable respectively of producing light of three component image colors when excited by electron beam energy, a system for maintaining said electron beam energy directed toward proper ones of said phosphor strips comprising, a source of three trains of video signals representing respectively said component image colors, means for providing one of said video signal trains representing a particular image color with a component having a predetermined high frequency, means for modulating said electron beam energy in accordance with said video signal trains, a system for deflecting said beam energy to scan a raster at said luminescent screen so that, normally, only screen-produced light of said particular color has said predetermined high frequency modulation component, photosensitive signal-generating means responsive to screen-produced light of the other two of said component image colors, detecting means coupled to said photosensitive means and responsive only to signals of said predetermined frequency to develop beam-control energy representative of any mis-direction of said electron beam energy relative to said phosphor strips, and auxiliary vertical beam-deflecting means connected for control by said beam-control energy for correcting the direction of said electron beam energy.

VERNON D. LANDON.

REFERENCES CITED

The following references are of record in the file of this patent:

UNITED STATES PATENTS

| Number | Name | Date |
|---|---|---|
| 2,481,839 | Goldsmith | Sept. 13, 1949 |
| 2,490,812 | Huffman | Dec. 13, 1949 |
| 2,530,431 | Huffman | Nov. 21, 1950 |